(12) United States Patent
Guy et al.

(10) Patent No.: US 9,334,169 B2
(45) Date of Patent: May 10, 2016

(54) METHOD FOR PREPARING PRECIPITATED SILICAS CONTAINING ALUMINIUM

(75) Inventors: Laurent Guy, Rillieux la Pape (FR); Dominique Dupuis, Crépy-en-Valois (FR); Eric Perin, Villefranche-sur-Saonne (FR)

(73) Assignee: RHODIA OPERATIONS, Paris (FR)

( * ) Notice: Subject to any disclaimer, the term of this patent is extended or adjusted under 35 U.S.C. 154(b) by 269 days.

(21) Appl. No.: 13/636,995

(22) PCT Filed: Mar. 25, 2011

(86) PCT No.: PCT/EP2011/054645
§ 371 (c)(1),
(2), (4) Date: Mar. 7, 2013

(87) PCT Pub. No.: WO2011/117400
PCT Pub. Date: Sep. 29, 2011

(65) Prior Publication Data
US 2013/0156674 A1    Jun. 20, 2013

(30) Foreign Application Priority Data

Mar. 25, 2010  (FR) ...................................... 10 01195

(51) Int. Cl.
*C01B 33/26* (2006.01)
*C01B 33/187* (2006.01)
*C01B 33/193* (2006.01)

(52) U.S. Cl.
CPC ............. *C01B 33/187* (2013.01); *C01B 33/193* (2013.01)

(58) Field of Classification Search
CPC ............................. C01B 33/193; C01B 33/187
USPC ........................................................ 423/327.1
See application file for complete search history.

(56) References Cited

U.S. PATENT DOCUMENTS

| 4,076,549 | A | 2/1978 | Wason |
| 6,268,424 | B1 | 7/2001 | Blume et al. |
| 6,716,408 | B1 | 4/2004 | Gronchi et al. |
| 2002/0112647 | A1 | 8/2002 | Lindner et al. |
| 2003/0066459 | A1 | 4/2003 | Bomal et al. |
| 2008/0019898 | A1 | 1/2008 | Dromard et al. |

FOREIGN PATENT DOCUMENTS

EP    0 983 966 A1    3/2000

OTHER PUBLICATIONS

International Search issued on Sep. 5, 2011, by the European Patent Office as the International Searching Authority in International Patent Application No. PCT/EP2011/054645.

*Primary Examiner* — Colleen Dunn
*Assistant Examiner* — Haytham Soliman

(57) ABSTRACT

A method for preparing precipitated silicas is described. A precipitation reaction between a silicate and an acidifying agent is also described, wherein a precipitated silica suspension is produced, and, subsequently, separation and drying of the suspension is conducted, in which, inter alia, one of the following three operations (a, b or c) is performed: (a) simultaneously adding a compound of aluminium and a basic agent, (b) simultaneously adding a silicate and a compound of aluminium, (c) simultaneously adding the acidifying agent, a silicate and a compound of aluminium.

6 Claims, No Drawings

METHOD FOR PREPARING PRECIPITATED SILICAS CONTAINING ALUMINIUM

CROSS-REFERENCE TO PRIOR APPLICATIONS

This application is a National Stage of PCT/EP2011/054645, filed Mar. 25, 2011, and designating the United States (published in French on Sep. 29, 2011, as WO 2011/117400 A1; the title and abstract were published in English), which claims priority to FR 10 01195, filed Mar. 25, 2010, each hereby expressly incorporated by reference in its entirety and each assigned to the assignee hereof.

The present invention relates to a novel process for preparing precipitated silica.

It is known practice to use precipitated silicas as catalyst supports, as absorbents for active materials (in particular supports for liquids, for example used in food, such as vitamins (especially vitamin E), choline chloride), as viscosity-increasing agents, texturizers or anticaking agents, as elements for battery separators, as a toothpaste additive, and for paper.

Precipitated silicas may also be used as reinforcing fillers in silicone matrices (for example for coating electrical cables) or in compositions based on polymer(s), especially elastomer(s).

The aim of the present invention is to propose a novel process for preparing precipitated silica containing aluminum, which constitutes an alternative to the known processes for preparing precipitated silica.

Thus, one subject of the invention is a novel process for preparing precipitated silica, comprising the precipitation reaction between a silicate and an acidifying agent, via which a suspension of precipitated silica is obtained, followed by the separation and drying of this suspension, in which:
the precipitation reaction is performed in the following manner:
   (i) an initial feedstock is formed comprising a silicate and an electrolyte, the concentration of silicate (expressed as $SiO_2$) in said initial feedstock being less than 100 g/L and the concentration of electrolyte in said initial feedstock being less than 17 g/L,
   (ii) the acidifying agent is added to said feedstock until a pH value of the reaction medium of at least 7 is obtained,
   (iii) acidifying agent and a silicate are simultaneously added to the reaction medium,
a suspension with a solids content of not more than 24% by weight is dried,
said process comprising one of the following three operations (a), (b) or (c):
   (a) at least one compound A of aluminum and a basic agent are simultaneously added to the reaction medium, after step (iii),
   (b) a silicate and at least one compound A of aluminum are simultaneously added to the reaction medium, in place of step (iii),
   (c) step (iii) is performed by simultaneously adding to the reaction medium acidifying agent, a silicate and at least one aluminum compound B.

It should be noted, in general, that this preparation process is a process for synthesizing precipitated silica, i.e. that an acidifying agent is reacted, under particular conditions, with a silicate.

The choice of the acidifying agent and the silicate is made in a manner that is well known per se.

A strong mineral acid such as sulfuric acid, nitric acid or hydrochloric acid, or an organic acid such as acetic acid, formic acid or carbonic acid is generally used as acidifying agent.

The acidifying agent may be dilute or concentrated; its normality may be between 0.4 and 36 N, for example between 0.6 and 1.5 N.

In particular, in the case where the acidifying agent is sulfuric acid, its concentration may be between 40 and 180 g/L, for example between 60 and 130 g/L.

Any common form of silicates may moreover be used as silicate, such as metasilicates and disilicates, and advantageously an alkali metal silicate, especially sodium or potassium silicate.

The silicate may have a concentration (expressed as $SiO_2$) of between 40 and 330 g/L, for example between 60 and 300 g/L.

In general, sulfuric acid is used as acidifying agent and sodium silicate is used as silicate.

In the case where sodium silicate is used, it generally has an $SiO_2/Na_2O$ weight ratio of between 2.5 and 4, for example between 3.1 and 3.8.

The reaction of the silicate with the acidifying agent takes place in a specific manner according to the following steps.

First, a feedstock which comprises silicate and an electrolyte is formed (step (i)). The amount of silicate present in the initial feedstock advantageously represents only part of the total amount of silicate employed in the reaction.

The term "electrolyte" is understood here in its generally accepted meaning, i.e. it means any ionic or molecular substance which, when it is in solution, decomposes or dissociates to form ions or charged particles. Electrolytes that may be mentioned include a salt of the group of salts of alkali metals and alkaline-earth metals, especially the salt of the starting silicate metal and of the acidifying agent, for example sodium chloride in the case of the reaction of a sodium silicate with hydrochloric acid or, preferably, sodium sulfate in the case of the reaction of a sodium silicate with sulfuric acid.

The electrolyte concentration in the initial feedstock is (greater than 0 g/L and) less than 17 g/L, for example less than 14 g/L.

The concentration of silicate (expressed as $SiO_2$) in the initial feedstock is (greater than 0 g/L and) less than 100 g/L; preferably, this concentration is less than 90 g/L, especially less than 85 g/L.

The second step consists in adding the acidifying agent to the composition feedstock described above (step (ii)).

This addition, which results in a correlated reduction in the pH of the reaction medium, takes place until a pH value of at least 7 is reached, generally between 7 and 8.

Once the desired pH value has been reached, a simultaneous addition (step (iii)) of acidifying agent and of silicate is performed.

This simultaneous addition is generally performed such that the pH value of the reaction medium is constantly equal (to within +/−0.1) that reached after step (ii).

The preparation process according to the invention comprises one of the three operations (a), (b) or (c) mentioned previously, i.e.:
   (a) at least one aluminum compound A and a basic agent are simultaneously added to the reaction medium, after step (iii), the separation performed in the process preferably comprising a filtration and breakdown of the cake obtained from this filtration, said breakdown then preferably being performed in the presence of at least one aluminum compound B, (b) a silicate and at least one aluminum compound A are simultaneously added to the reaction medium, in place of step (iii), the separation performed in the process preferably comprising a filtration and a disintegrating of the cake derived from this filtration, the disintegrating then preferably being performed in the presence of at least one aluminum compound B, or (c) acidifying agent, a silicate and at least one aluminum compound B are simultaneously added to the reaction medium during step (iii), the separation performed in the process preferably comprising a filtration and a disintegrating of the cake derived from this filtration, the disintegrating then optionally being performed in the presence of at least one aluminum compound B.

Advantageously, the preparation process in accordance with the invention comprises one of the two operations (b) or (c).

In a first variant (variant not preferred) of the preparation process according to the invention (i.e. when the process comprises operation (a)), the following steps are advantageously performed, after having performed the precipitation according to steps (i), (ii) and (iii) described previously:

(iv) at least one aluminum compound A and a basic agent are simultaneously added to the reaction medium (i.e. to the reaction suspension or broth obtained), preferably until a pH value of the reaction medium of between 6.5 and 10 and in particular between 7.2 and 8.6 is obtained, and then (v) acidifying agent is added to the reaction medium, preferably until a pH value of the reaction medium of between 3 and 5 and in particular between 3.4 and 4.5 is obtained.

After the simultaneous addition of step (iii), maturation of the reaction medium may be performed, this maturation possibly lasting, for example, from 1 to 60 minutes, in particular from 3 to 30 minutes.

In this first variant, it may be desirable, between step (iii) and step (iv), and especially before said optional maturation, to add to the reaction medium an additional amount of acidifying agent. This addition generally takes place until a pH value of the reaction medium of between 3 and 6.5 and in particular between 4 and 6 is obtained.

The acidifying agent used during this addition is generally identical to that employed in steps (ii), (iii) and (v) of the first variant of the process.

Maturation of the reaction medium is usually performed between step (iv) and step (v), for example for 2 to 60 minutes, in particular for 5 to 45 minutes.

Similarly, maturation of the reaction medium is usually performed after step (v), for example for 2 to 60 minutes, in particular for 5 to 30 minutes.

The basic agent used in step (iv) may be an aqueous ammonia solution or, preferably, a sodium hydroxide solution.

In a second variant (preferred variant) of the process according to the invention (i.e. when it comprises operation (b)), in place of step (iii) described previously, a step (iv) is performed, which consists in simultaneously adding to the reaction medium a silicate and at least one aluminum compound A.

The simultaneous addition of step (iv) is generally performed such that the pH value of the reaction medium is constantly equal (to within +/−0.1) that reached after step (ii).

After the simultaneous addition of step (iv), maturation of the reaction medium may be performed, this maturation possibly lasting, for example, from 2 to 60 minutes, in particular from 5 to 30 minutes.

In this second variant, it may be desirable, after step (iv) and especially after this optional maturation, to add to the reaction medium an additional amount of acidifying agent. This addition is generally performed until a pH value of the reaction medium of between 3 and 6.5 and in particular between 4 and 6 is obtained.

The acidifying agent used during this addition is generally identical to that employed in step (ii) of the second variant of the process.

Maturation of the reaction medium is usually performed after this addition of acidifying agent, for example for 1 to 60 minutes, in particular for 3 to 30 minutes.

The aluminum compound A employed in the preparation process of the invention (in particular in the first two variants mentioned) is generally an organic or inorganic aluminum salt.

Examples of organic salts that may especially be mentioned include salts of carboxylic or polycarboxylic acids, for instance the salts of acetic, citric, tartaric or oxalic acid.

Examples of inorganic salts that may especially be mentioned include halides and oxyhalides (for instance chlorides and oxychlorides), nitrates, phosphates, sulfates and oxysulfates.

In practice, the aluminum compound A may be used in the form of a solution, generally an aqueous solution.

Preferably, an aluminum sulfate is employed as aluminum compound A.

In a third variant (other preferred variant) of the preparation process of the invention (i.e. when it comprises operation (c)), after having performed steps (i) and (ii) described previously, a step (iii) is advantageously performed, which consists in simultaneously adding to the reaction medium acidifying agent, a silicate and at least one aluminum compound B.

This simultaneous addition is generally performed such that the pH value of the reaction medium is constantly equal (to within +/−0.1) that reached after step (ii).

In this third variant, it may be desirable, after step (iii), to add to the reaction medium an additional amount of acidifying agent. This addition generally takes place until a pH value of the reaction medium of between 3 and 6.9 and in particular between 4 and 6.6 is obtained.

The acidifying agent used in this addition is generally identical to that employed in steps (ii) and (iii).

Maturation of the reaction medium is usually performed after this addition of acidifying agent, for example for 1 to 60 minutes, in particular for 3 to 30 minutes.

The aluminum compound B employed in the third variant is generally an alkali metal aluminate, especially of potassium or, preferably, of sodium.

The temperature of the reaction medium is generally between 70 and 98° C.

According to one variant, the reaction is performed at a constant temperature of between 75 and 96° C.

According to another variant (preferred), the reaction end temperature is higher than the reaction start temperature: thus, the temperature at the start of the reaction is preferably maintained between 70 and 96° C., and the temperature is then increased over a few minutes, preferably up to a value of between 80 and 98° C., at which value it is maintained until the end of the reaction; operations (a) or (b) are thus usually performed at this constant temperature value.

After the steps that have just been described, a silica broth is obtained, which is then separated (liquid-solid separation).

In general, this separation comprises a filtration (followed by washing, if necessary) and a disintegrating, said disintegrating then possibly being (preferably in the case of the first two variants mentioned, optionally in the case of the third variant) performed in the presence of at least one aluminum compound B and, optionally, in the presence of an acidifying agent as described previously (in the latter case, the aluminum compound B and the acidifying agent are advantageously added simultaneously).

The disintegrating operation, which may be performed mechanically, for example by passing the filter cake into a colloidal mill or a ball mill, makes it possible especially to lower the viscosity of the suspension to be dried (in particular to be atomized) subsequently.

The aluminum compound B is usually different than the aluminum compound A mentioned previously and generally consists of an alkali metal aluminate, especially of potassium or, preferably, of sodium.

Preferably, the amounts of aluminum compounds A and B used in the preparation process of the invention are such that the precipitated silica obtained contains more than 0.5% by weight of aluminum.

The separation performed in the preparation process of the invention usually comprises a filtration (with washing, if necessary) performed by means of any suitable method, for example by means of a band filter, a vacuum filter or, preferably, a filter press.

The precipitated silica suspension thus recovered (filter cake) is then dried.

In the preparation process in accordance with the invention, this suspension must have, immediately before drying, a solids content of not more than 24% by weight and preferably not more than 22% by weight.

This drying may be performed according to any means known per se.

Preferably, the drying is performed by atomization. To this end, any suitable type of atomizer may be used, especially a turbine atomizer, a nozzle atomizer, a liquid-pressure atomizer or a two-fluid atomizer. In general, when the filtration is performed using a filter press, a nozzle atomizer is used, and when the filtration is performed using a filter under vacuum, a turbine atomizer is used.

When the drying is performed using a nozzle atomizer, the precipitated silica that may then be obtained is usually in the form of substantially spherical beads.

After this drying, a milling step may optionally be performed on the recovered product; the precipitated silica that may then be obtained is generally in the form of a powder.

When the drying is performed using a turbine atomizer, the precipitated silica that may then be obtained may be in the form of a powder.

Finally, the dried product (dried especially with a turbine atomizer) or milled product as indicated previously may optionally be subjected to an agglomeration step, which consists, for example, of a direct compression, wet granulation (i.e. with use of a binder such as water, silica suspension, etc.), extrusion or, preferably, dry compacting. When the latter technique is used, it may prove appropriate, before performing the compacting, to deaerate (operation also known as predensification or degassing) the pulverulent products so as to remove the air included therein and to ensure more uniform compacting.

The precipitated silica that may then be obtained via this agglomeration step is generally in the form of granules.

Implementation of the preparation process according to the invention makes it possible especially to obtain a precipitated silica with an aluminum content of greater than 0.5% by weight of aluminum.

Said precipitated silica generally has an aluminum content of not more than 7.0% by weight, preferably not more than 5.0% by weight, in particular not more than 3.5% by weight, for example not more than 3.0% by weight.

Preferably, its aluminum content is between 0.75% and 4.0% by weight, even more preferably between 0.8% and 3.5% by weight, in particular between 0.9% and 3.2% by weight, especially between 0.9% and 2.5% by weight or between 1.0% and 3.1% by weight. It is, for example, between 1.0% and 3.0% by weight or even between 1.0% and 2.0% by weight.

The amount of aluminum may be measured via any suitable method, for example by ICP-AES (inductively coupled plasma—atomic emission spectroscopy) after dissolving in water in the presence of hydrofluoric acid.

The aluminum is generally located essentially at the surface of the precipitated silica.

Although the aluminum may be present in tetrahedral form, and also in octahedral form and in pentahedra) form, in particular in tetrahedral form and in octahedral form, in the precipitated silica obtained according to the invention, it is preferably essentially in tetrahedral form (more than 50%, in particular at least 90%, especially at least 95%, by number, of the aluminum species are then in tetrahedral form); the bonds are then rather essentially of the SiOAl type.

The precipitated silica containing aluminum obtained via the process according to the invention, in particular according to one of the preferred variants comprising operation (b) or operation (c), is advantageously highly dispersible, i.e. in particular it has a very high capacity for deagglomeration and for dispersion in a polymer matrix, which may especially be observed by electron or optical microscopy, on thin slices.

The precipitated silica prepared via the process according to the invention preferably has a CTAB specific surface area of between 70 and 240 $m^2/g$.

This specific surface area may be between 70 and 100 $m^2/g$, for example between 75 and 95 $m^2/g$.

However, very preferably, its CTAB specific surface area is between 100 and 240 $m^2/g$, in particular between 140 and 200 $m^2/g$.

Similarly, preferably, it has a BET specific surface area of between 70 and 240 $m^2/g$.

This surface area may be between 70 and 100 $m^2/g$, for example between 75 and 95 $m^2/g$.

However, very preferably, its BET specific surface area is between 100 and 240 $m^2/g$, in particular between 140 and 200 $m^2/g$.

The CTAB specific surface area is the outer surface area, which may be determined according to method NF T 45007 (November 1987). The BET specific surface area may be measured according to the Brunauer-Emmett-Teller method described in *The Journal of the American Chemical Society*, vol. 60, page 309 (1938) and corresponding to standard NF T 45007 (November 1987).

The dispersibility (and the capacity for deagglomeration) of the precipitated silicas obtained via the process according to the invention may be assessed by means of the following test, via a particle size measurement (by laser scattering) performed on a silica suspension that has been deagglomerated beforehand by ultrasonication (rupture of objects from 0.1 to a few tens of microns). Ultrasonic deagglomeration is performed using a Vibracell Bioblock sonicator (750 W) equipped with a probe 19 mm in diameter. The particle size measurement is performed by laser scattering on a Sympatec granulometer, using the Fraunhofer theory.

2 grams of silica are weighed out in a pill bottle (height: 6 cm, and diameter: 4 cm), and the weight is made up to 50 grams by adding deionized water: a 4% aqueous silica suspension is thus obtained, which is homogenized for 2 minutes by magnetic stirring. Ultrasonic deagglomeration is then performed as follows: with the probe immersed over a length of 4 cm, it is switched on for 5 minutes 30 seconds at 80% of its nominal power (amplitude). The particle size measurement is then performed by introducing into the granulometer cuvette a volume V (expressed in ml) of the homogenized suspension necessary to obtain an optical density of about 20.

The median diameter value $Ø_{50}$ that is obtained according to this test is proportionately smaller the higher the capacity for deagglomeration of the silica.

A deagglomeration factor $F_D$ is given by the equation: $F_D = 10 \times V$/optical density of the suspension measured by the granulometer (this optical density is about 20).

This deagglomeration factor $F_D$ is indicative of the content of particles less than 0.1 µm in size that are not detected by the granulometer. This factor is proportionately higher the greater the capacity for deagglomeration of the silica.

In general, the precipitated silicas containing aluminum prepared via the process according to the invention have a median diameter $Ø_{50}$, after ultrasonic deagglomeration, of less than 5 µm, in particular less than 4 µm, for example less than 3 µm.

They usually have an ultrasonic deagglomeration factor $F_D$ of greater than 4.5 ml, in particular greater than 5.5 ml, for example greater than 10 ml.

Their DOP oil uptake may be less than 300 ml/100 g, for example between 200 and 295 ml/100 g. The DOP oil uptake may be determined according to standard ISO 787/5 using dioctyl phthalate.

One of the parameters of the silica obtained via the process according to the invention may lie in the distribution of its pore volume, and especially in the distribution of the pore volume which is generated by pores with diameters of less than or equal to 400 Å. The latter volume corresponds to the working pore volume of the fillers employed in the reinforcement of the elastomers. In general, analysis of the programs shows that this silica preferably has a pore distribution such that the pore volume generated by pores whose diameter is between 175 and 275 Å (V2) represents less than 50% of the pore volume generated by pores with diameters of less than or equal to 400 Å (V1).

The pore volumes and pore diameters are measured by mercury (Hg) porosimetry, using a Micromeritics Autopore 9520 porosimeter, and are calculated by the Washburn relationship with a theta contact angle equal to 130° and a gamma surface tension equal to 484 dynes/cm.

The pH of the precipitated silica obtained via the process according to the present invention is generally between 6.3 and 7.6.

The pH is measured according to the following method derived from standard ISO 787/9 (pH of a suspension at 5% in water):
Apparatus:
 calibrated pH-meter (1/100 reading precision)
 combined glass electrode
 200 mL beaker
 100 mL measuring cylinder
 balance accurate to within 0.01 gram.
Procedure:
 5 grams of silica are weighed out to within 0.01 gram in the 200 mL beaker. 95 mL of water measured using the graduated cylinder are then added to the silica powder. The suspension thus obtained is stirred vigorously (magnetic stirring) for 10 minutes. The pH measurement is then performed.

The physical state in which the precipitated silica prepared via the process according to the invention is found may be any state, i.e. it may be, for example, in the form of micropearls (substantially spherical beads), powder or granules.

It may thus be in the form of substantially spherical beads with a mean size of at least 80 µm, preferably of at least 150 µm and in particular between 150 and 270 µm; this mean size is determined according to standard NF X 11507 (December 1970) by dry screening and determination of the diameter corresponding to a cumulative screen overflow of 50%.

It may be in the form of powder with a mean size of at least 3 µm, in particular of at least 10 µm and preferably of at least 15 µm.

It may be in the form of granules (generally of substantially parallelepipedal shape) with a size of at least 1 mm, for example between 1 and 10 mm, especially along the axis of their greatest length.

The precipitated silica prepared via the process according to the invention may be used in many applications.

It may be used, for example, as a catalyst support, as an absorbent for active materials (in particular as a support for liquids, especially used in food, such as vitamins (vitamin E), choline chloride), in polymer, especially elastomer, or silicone compositions, as a viscosity-increasing agent, texturizer or anticaking agent, as an element for battery separators, or as a toothpaste, concrete or paper additive.

It may thus be used in the reinforcement of natural or synthetic polymers.

The polymer compositions in which it may be employed, especially as reinforcing filler, are generally based on one or more polymers or copolymers, in particular on one or more elastomers, preferably having at least one glass transition temperature of between −150 and +300° C., for example between −150 and +20° C.

As possible polymers, mention may be made especially of diene polymers, in particular diene elastomers.

Non-limiting examples of finished articles based on said polymer compositions that may be mentioned include shoe soles, tires, floor coverings, gas barriers, flame-retardant materials and also technical components such as cable car rollers, seals for household electrical appliances, seals for liquid or gas pipes, braking system seals, pipes (hoses), sheaths (especially cable sheaths), cables, engine mountings, conveyor belts and transmission belts.

The examples that follow illustrate the invention without, however, limiting its scope.

EXAMPLE 1

The following are introduced into a stainless-steel reactor equipped with a paddle stirring system and an external electric heater:
 29.335 kg of water
 509 g of $Na_2SO_4$
 17.3 kg of aqueous sodium silicate, in an $SiO_2/Na_2O$ weight ratio equal to 3.44 and having a density at 20° C. equal to 1.232.

The concentration of silicate (expressed as $SiO_2$) in the initial feedstock is then 76.5 g/L.

The mixture is then brought to a temperature of 83° C. with continued stirring. 17 180 g of dilute sulfuric acid with a density at 20° C. equal to 1.050 are then introduced therein in order to obtain in the reaction medium a pH value (measured at its temperature) equal to 8. The reaction temperature is 83° C. for the first 20 minutes; it is then raised from 83 to 92° C. over about 30 minutes, which corresponds to the end of the acidification.

4100 g of aqueous sodium silicate of the type described above and 7540 g of aluminum sulfate solution with a density at 20° C. equal to 1.056 are then introduced in combination into the reaction medium, this simultaneous introduction of aluminum sulfate and of silicate being performed such that the pH of the reaction medium during the introduction period is constantly equal to 8.0±0.1. After this joint addition, sulfuric acid of the type described above is introduced into the reaction medium, over 5 minutes, so as to bring the pH of the reaction medium to a value equal to 5.2. After this introduction of acid, the reaction slurry obtained is kept stirring for 5 minutes.

The total reaction time is 85 minutes.

A slurry or suspension of precipitated silica is thus obtained, which is then filtered and washed using a flat filter.

The cake obtained is then fluidized by mechanical and chemical action (simultaneous addition of sulfuric acid and of an amount of sodium aluminate corresponding to an Al/SiO$_2$ weight ratio of 0.3%). After this disintegrating operation, the resulting slurry, with a pH equal to 6.5 and a loss on ignition equal to 85.0% (and thus a solids content of 15.0% by weight), is dried by atomization.

The characteristics of the silica obtained in powder form are thus as follows:

| | |
|---|---|
| CTAB specific surface area | 158 m$^2$/g |
| BET specific surface area | 178 m$^2$/g |
| weight content of aluminum | 1.5% |
| V2/V1 ratio | 47% |
| pH | 7.5 |

This silica is subjected to the deagglomeration test as defined previously in the description.

After ultrasonic deagglomeration, it has a median diameter ($\varnothing_{50}$) of 2.9 μm.

EXAMPLE 2

The following are introduced into a stainless steel reactor equipped with a paddle stirring system and an external electric heater:

29.35 kg of water
509 g of Na$_2$SO$_4$
17.2 kg of aqueous sodium silicate, in an SiO$_2$/Na$_2$O weight ratio equal to 3.44 and with a density at 20° C. equal to 1.230.

The concentration of silicate (expressed as SiO$_2$) in the initial feedstock is then 76.5 g/L.

The mixture is then brought to a temperature of 83° C. with continued stirring. 16 900 g of dilute sulfuric acid with a density at 20° C. equal to 1.050 are then introduced therein so as to obtain in the reaction medium a pH value (measured at its temperature) equal to 8. The reaction temperature is 83° C. for the first 20 minutes; it is then raised from 83 to 92° C. over about 30 minutes, which corresponds to the end of the acidification.

4100 g of aqueous sodium silicate of the type described above, 2150 g of dilute sodium aluminate with a density at 20° C. equal to 1.237 and 6000 g of sulfuric acid of the type described above are then introduced in combination into the reaction medium, this simultaneous introduction of acid, silicate and sodium aluminate being performed such that the pH of the reaction medium, during the introduction period, is constantly equal to 8.0±0.1.

After this joint addition, introduction into the reaction medium of sulfuric acid of the type described above is continued for 3.5 minutes so as to bring the pH of the reaction medium to a value equal to 6.5. After this introduction of acid, the reaction slurry obtained is kept stirring for 5 minutes.

The total reaction time is 87 minutes.

A slurry or suspension of precipitated silica is thus obtained, which is then filtered and washed using a flat filter.

The cake obtained is then fluidized by mechanical action. After this disintegrating operation, the resulting slurry, with a loss on ignition equal to 84.5% (and thus a solids content of 15.5% by weight), is dried by atomization.

The characteristics of the silica obtained in powder form are then as follows:

| | |
|---|---|
| CTAB specific surface area | 135 m$^2$/g |
| BET specific surface area | 160 m$^2$/g |
| weight content of aluminum | 2.7% |
| V2/V1 ratio | 40% |
| pH | 6.7 |

This silica is subjected to the deagglomeration test as defined previously in the description.

After ultrasonic deagglomeration, it has a median diameter ($\varnothing_{50}$) of 2.9 μm.

The invention claimed is:

1. A process for preparing silica comprising aluminum, the process comprising conducting a precipitation reaction between a silicate and an acidifying agent, via which a suspension of precipitated silica is obtained, followed by a separation and drying of this suspension, wherein:
   the precipitation reaction is performed in the following manner:
      forming an initial feedstock comprising a silicate and an electrolyte, wherein a concentration of silicate (expressed as SiO$_2$) in said initial feedstock is less than 100 g/L and a concentration of electrolyte in said initial feedstock is less than 17 g/L,
      (ii) adding the acidifying agent to said feedstock until the reaction medium has a pH value of at least 7,
      (iii) simultaneously adding an acidifying agent, a silicate and at least one aluminum compound B to the reaction medium, and
   drying a suspension with a solids content of not more than 24% by weight.

2. The process as defined by claim 1, wherein that, after step (iii), acidifying agent is added to the reaction medium.

3. The process as defined by claim 2, wherein compound B is an alkali metal aluminate.

4. The process as defined by claim 1, wherein the separation comprises a filtration and a disintegrating of the cake resulting from the filtration.

5. The process described by claim 2, wherein the acidifying agent is added after step (iii) until the reaction medium has a pH of from 3 to 6.9.

6. The process described by claim 3, wherein the alkali metal aluminate is a sodium aluminate.

* * * * *